United States Patent [19]

Chasin et al.

[11] 4,012,353
[45] Mar. 15, 1977

[54] COPOLYMER HAVING QUATERNARY AMMONIUM, N-ALKOXYALKYL AMIDO, AND CARBOXY GROUPS, OPTIONALLY EPOXY RESIN, AND AQUEOUS DISPERSIONS

[75] Inventors: David Gilbert Chasin; Joseph Feltzin, both of Wilmington, Del.

[73] Assignee: ICI United States Inc., Wilmington, Del.

[22] Filed: Feb. 3, 1975

[21] Appl. No.: 546,344

[52] U.S. Cl. ............... 260/29.6 NR; 260/29.6 TA; 260/79.3 M; 260/79.7; 260/835; 260/873; 526/245; 526/248; 526/277; 526/292; 526/304

[51] Int. Cl.² ................ C08F 20/06; C08F 220/06

[58] Field of Search ... 260/834, 29.6 TA, 29.6 NA, 260/79.3 M, 837; 526/245, 277, 287, 288, 292, 304

[56] References Cited

UNITED STATES PATENTS

| | | |
|---|---|---|
| 2,978,437 | 4/1961 | Christenson ................ 260/834 |
| 3,060,144 | 10/1962 | Gaylord ...................... 260/834 |
| 3,183,281 | 5/1965 | Clemens ..................... 260/834 |
| 3,222,321 | 12/1965 | Sekmakas ................... 260/834 |
| 3,245,939 | 4/1966 | Bergmeister et al. ....... 260/834 |

*Primary Examiner*—Murray Tillman
*Assistant Examiner*—A. H. Koeckert

[57] ABSTRACT

Cationic, cross-linkable acrylic-polyester emulsion binder resin systems are described which are useful as adhesives for binding organic, metal, and glass filaments to each other and to various substrates in the preparation of reinforced composites. These novel binder resin systems are derived from copolymerized ethylenically unsaturated monomers having pendant non-functional, cross-linking functional, and cationic groups. The cationic polymer emulsions are particularly useful when they are cross-linked with polyester resin polymer chains such as those formed by condensing unsaturated dicarboxylic acids with polyols and which can be applied as stable aqueous emulsions.

7 Claims, No Drawings

COPOLYMER HAVING QUATERNARY AMMONIUM, N-ALKOXYALKYL AMIDO, AND CARBOXY GROUPS, OPTIONALLY EPOXY RESIN, AND AQUEOUS DISPERSIONS

The present invention relates to cationic resins and sizes which are especially useful in preparing composites containing fiber glass, organic or metal fibers as a reinforcing agent. Most particularly, it relates to acrylic polymers of copolymerized ethylenically unsaturated monomers having a salt of a quaternized nitrogen atom as a substituent. Such cationic polymers are especially useful when they are cross-linked with a conventional polyester resin through copolymerized monomers having active groups which will chemically bind the cationic polymer resin to the polyester chain.

The cationic cross-linkable resin of the invention comprises a thermosettable copolymer of at least one non-functional alpha,beta-ethylenically unsaturated main monomer, at least one carboxyl group containing alpha,beta-ethylenically unsaturated monomer, an optional lower alkyl ester containing alpha,beta-ethylenically unsaturated monomer, 1–15 percent by weight of an N-alkoxyalkyl amido group containing alpha,beta-ethylenically unsaturated monomer, 1–15 weight percent of an alpha,beta-ethylenically unsaturated monomer having a salt of a quaternized nitrogen atom as a substituent, and an optional cross-linkable modifier. The invention also includes cationic polymer materials cross-linked with polyester resins.

The use of alpha,beta-ethylenically unsaturated monomers containing a quaternary ammonium group has been previously described in U.S. Pat. Nos. 2,923,701; 3,170,901; 3,171,805; 3,414,513; 3,758,445; and 3,780,092. Copolymers containing alkoxyalkyl acrylamides are described in U.S. Pat. Nos. 2,897,101; 2,923,653; 3,157,562; 3,776,810; 3,812,067; 3,170,901; 3,255,139; 3,228,740; 3,374,789; 3,652,478; and 3,799,910. The use of monomers and polymers containing epoxy functional groups have previously been described in U.S. Pat. Nos. 2,604,464; 3,230,204; 3,264,370; 2,798,861; 2,604,457; 3,222,420; 3,179,714; 3,810,859; 2,964,492; 3,074,834; 2,550,465; 3,381,054; and British Pat. Nos. 867,545 and 868,335. Cross-linked acrylic/polyester resin copolymers are described in U.S. Pat. No. 3,843,593.

Fiber reinforced plastics such as glass reinforced materials are well-known in the art and are generally prepared by combining fibers in the form of a continuous layer or mat with a suitable resinous composition. The resinous compositions most frequently employed comprises polyester resin and a vinyl monomer. Of the numerous vinyl monomers which are employed in the industry today, styrene is most generally used because of its availability and low cost.

Fibrous composites employed in the preparation of reinforced materials are made by spray coating the fibrous substrate with an aqueous emulsion of a compatible binder resin and thereafter heating the fibrous material to remove water thereby enabling the intertwined fibers to become bonded to one another at points of contact. Most satisfactory binder resins, therefore, must show good adherence to the fibrous materials such as glass, metal, and other organic fibers, and must be sufficiently flexible so that they maintain their integrity during handling and for a certain time after they are placed into a mold during which they are subjected to a large quantity of resinous composition, heat and pressure.

Prior art binder resin systems for use as dilute aqueous emulsions have been deficient in that they tend to separate, form undesirable coagulants and gums, and have a tendency to dissolve rapidly in monomer-resin solutions into which they are placed.

It is the object of the present invention to provide cross-linkable cationic resin compositions useful as stable aqueous emulsions wherein the emulsified resin comprises the reaction product of alpha,beta-ethylenically unsaturated monomers having functional, non-functional, cross-linkable N-alkoxyamido groups and pendant cationic quaternary ammonium groups.

It is another object of the invention to provide cationic polymer compositions cross-linked with polyester resins.

Another object is to provide stable aqueous emulsions of cationic binder resins which, when cured, are relatively insoluble in styrene monomer.

The cross-linkable cationic copolymer resin compositions of the invention are latex formulations comprising:

a. 30–80 percent by weight of a non-functional alpha,beta-ethylenically unsaturated main monomer such as styrene, alkyl substituted styrenes; lower alkyl acrylates such as methyl acrylate, ethyl acrylate, butyl acrylate; methyl methacrylate, ethyl methacrylate, butyl methacrylate; vinyl ethers such as butyl vinyl ether; vinyl esters such as vinyl acetate and substituted vinyl materials such as vinyl chloride; lower dialkyl itaconates, lower dialkyl maleates, and lower dialkyl fumarates;

b. 0.1–15 percent by weight of an alpha,beta-ethylenically unsaturated monomer containing functional carboxyl groups such as acrylic acid, methacrylic acid, itaconic acid and lower monoalkyl itaconates, maleic acid and lower monoalkyl maleates, fumaric acid and lower monoalkyl fumarates;

c. up to 15 percent by weight alpha,beta-ethylenically unsaturated monomers containing amido groups such as lower alkyl acrylamides such as methacrylamide, ethylacrylamide and various N-substituted acrylamides such as N-methylolacrylamide, N-monoalkyl and dialkyl acrylamides; and methacrylamides such as N-monomethyl, monoethyl, monopropyl, monobutyl etc., and N-dimethyl, diethyl, dipropyl, dibutyl etc.; acrylamides and methacrylamides, N-monoaryl and diaryl acrylamides and alkacrylamides, for example, N-monophenyl and diphenyl acrylamides and methylacrylamides etc., modified acrylamides, diacetone acrylamides, polyamic acid, maleic acid mono and diamides, fumaric acid mono and diamides, maleimide, N-monoalkyl/aryl substituted amides, hydroxyethyl acrylate, and hydroxypropyl methacrylate;

d. 0.1–15 percent by weight alpha,beta-ethylenically unsaturated monomer having an N-alkoxyalkyl amide group such as derivatives of acrylamide and methacrylamide wherein the alkyl group is a radical having 1–4 carbon atoms with the alkoxy group having 1–4 carbon atoms such as ethoxymethyl, methoxymethyl, N-isobutoxymethyl, etc.;

e. up to 12 percent by weight of a cross-linking modifier which can be selected from a group consisting of epoxy resins having reactive epoxide

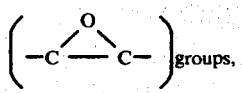 groups, melamine formaldehyde resins, and urea formaldehyde resins, cross-linking agents selected from compounds such as diglycidyl ether of glycerol, glycidyl methacrylate, monomers having an aminimide functional group ($-CON^-N^+R_3$) such as 1,1-dimethyl-1-(2-hydroxypropyl)amine methacrylimide; and f. 1 to 15 percent by weight of an alpha,beta-ethylenically unsaturated monomer having the following general formula: $CH_2=CR-Z-Y-NR'_3X$ wherein R is H or $-CH_3$; Z is $-CO_2-$, $-CONH-$; Y is a divalent hydrocarbon radical having 2–4 carbon atoms; R' is a monovalent hydrocarbon radical having 1–4 carbon atoms and X is an acid radical such as $F^-$, $Cl^-$, $Br^-$, $I^-$, $CH_3SO_4^-$, $C_2H_5SO_4^-$, and equivalent sulfonates, sulfites, phosphates, acetates, acrylates and the like, such as exemplified by dimethylaminoethyl methacrylate, dimethyl sulfate quaternary salt. Procedures for producing the monomeric quaternary ammonium salts include the reaction of the appropriate ethylenically unsaturated secondary amine with the mono or dialkyl salt such as dimethyl sulfate, alkyl halide, or acid.

The alkyl groups in all the above described compounds are hydrocarbon radicals having 1–4 carbon atoms.

Preferred cationic copolymer compositions based on the total weight of the polymerizing ingredients, are latex formulations comprising styrene in the range of 30–65 percent by weight, alkyl acrylates such as butyl acrylate in the range of 5–40 percent by weight, ethylenically unsaturated carboxylic acids in the range of 2–10 percent by weight, such as acrylic and methacrylic acid, 0.1–15 percent by weight methacrylate esters such as methyl methacrylate, dimethylaminoethyl methacrylate, 1–15 percent by weight quaternary ammonium salts, and 0.1–10 percent by weight epoxide containing monomers. Most preferred are those containing 0.1–15 percent by weight of unsaturated monomer having N-alkoxyalkyl amido cross-linking functional groups.

The composition ranges cited for the various monomeric ingredients are based upon the desired functionality required for particular end uses and economics rather than operability. The ranges are cited because they appear to provide suitable formulations which have greatest compatibility with the many various binder resin compositions used in manufacturing reinforced plastic items. Of course, the addition of greater amounts of one or another monomer may require the addition of more or less of a third and fourth comonomer to produce a cationic material having the desired stability in aqueous emulsions free of gums and coagulants. The concentration ranges cited above form cationic acrylic resins which are especially useful in aqueous emulsions because they form inherently stable emulsions which are particularly insensitive to destabilizing cationic ingredients normally found in aqueous coating baths, they cure at moderate temperatures, provide an antistatic size or binder for the fibers to which they are applied and they have controllable cross-link density and solubility. Of course, the composition ranges will also be determined by the nature of a reinforcing material used such as glass, metal and other organic fibrous materials.

Cationic resins are advantageously cross-linked with polyester resins which are condensation products formed by reacting dicarboxylic acids with polyols, but may also be intercross-linked without polyester and used as a binder. Cross-linking takes place by reaction of pendant functional groups on the cationic resin polymer chain with active hydrogens and hydroxyl or carboxyl groups on the polyester chain. Therefore, novel binder resins are preferred from cationic polymers having at least one monomer selected from groups (d) and (e) as above described and polyesters described hereinafter.

Representative of cross-linking materials are epoxy resins which include, for example, "Cardura" E, available from Shell Chemical Company, which is a glycidyl ester produced by reacting epichlorohydrin and a mixture of saturated, highly branched, mainly tertiary monocarboxylic acids having a $C_9$, $C_{10}$, and $C_{11}$ chain length ("Versatic" acid); "Genepoxy" M205 which is a modified diglycidyl ether of bisphenol A, available from General Mills, Inc.; "Epon" 812 which is a diglycidyl ether of glycerol, available from Shell Chemical Co.; "Epon" 826 which is substantially pure diglycidyl ether of bisphenol A, also available from Shell Chemical Co.; and "Epon" 828 which is a slightly resinified form of "Epon" 826 available from Shell Chemical Co.

Melamine formaldehyde resins refer to those materials which are well known in the art and are prepared by reacting melamine and formaldehyde. Modified melamine formaldehyde resins such as the alkylated melamine formaldehyde resins include butylated melamine formaldehyde resins may also be employed in the preparation of the resins utilized in accordance with this invention. Representative melamine formaldehyde resins which may be employed include for example such commercially available resins as "Cymel" 300, "Cymel" 301, and "Cymel" 303, all of which are available from American Cyanimide Company; "Uformite" MN83, available from Rohm and Haas Company; and "Resimine" 740, available from Monsanto Co. Similarly, urea formaldehyde resins include those materials which are well known in the art and are prepared by reacting urea and formaldehyde. Substituted urea formaldehyde resins such as alkylated urea formaldehyde resins may also be employed as a cross-linking material.

Of the above-described cross-linking modifier resins it is preferred to employ an epoxy resin by addition of the material either in the preparation of the thermosettable acrylic resin emulsion or at a time when the cationic emulsion and polyester resin suspension are combined as will be described hereinafter.

Polyesters are primarily polyesterification products of unsaturated dicarboxylic acids and polyhydric alcohols having from 2–26 carbon atoms and at least two hydroxyl groups exemplified by polyols such as ethylene glycol, diethylene glycol, propylene glycol, dipropylene glycol, glycerol, pentaerythritol, sorbitol, mannitol, sorbitan, erythritol, bisphenol A, and more preferably alkoxylated derivatives of 2,2-di(4-hydroxyphenyl)propane having in a range of 2–20 mols of ethylene oxide or propylene oxide per mol. The dicarboxylic acids may be unsaturated dicarboxylic acids such as fumaric acid and maleic acid, aromatic acids such as phthalic, terephthalic, isophthalic or aliphatic dicarboxylic acids such as succinic, adipic, suberic, azaleic, sebacic, dimethyl succinic, and halogenated derivatives of these acids such as tetrachlorophthalic acid. Polyester resins having a softening point in the range of 75°–120° C. have been found to be particularly useful in binder resins.

These polyesters are dispersed in aqueous media by mechanically agitating the polyester in water with the aid of a suitable surfactant system. The formation of polyester resin dispersions is demonstrated in the following examples:

POLYESTER RESIN A 46 parts of a polyester resin comprising a condensation product of 1 mol of a diol (prepared by reacting 2.2 mols of propylene oxide with 1 mol of 2,2-di(4-hydroxyphenyl)propane), 1 mol ethylene glycol and 2 mols of fumaric acid, and having an acid number of 31–35 and a softening point of 77°–81° C. is heated to about 160° C. and added slowly with vigorous agitation to an aqueous solution preheated to 70°–80° C. and containing 50 parts water, 2 parts of an emulsifier polyethyleneoxide(30)nonylphenol, and 2 parts of triethanol amine, to form a milky dispersion of the resin.

POLYESTER RESIN B

As described for Resin A, 46 parts of a resin formed by condensing equal molar amounts of a diol (formed by reacting 2.2 mols of propylene oxide with bisphenol-A) and fumaric acid into an aqueous solution containing 50 parts water, 2 parts triethanol amine and 2 parts polyoxyethylene(30)nonylphenol.

The binder resins useful in the present invention are prepared by known polymerization techniques. Preferred methods for preparing the binder resins include the following four procedures: In the first process, monomers, modifiers, a portion of the surface active substance, and a portion of the water are emulsified by vigorous agitation. These are slowly charged to the reaction vessel which contains all of the other components. The addition of the emulsion may continue for as long as 6–8 hours depending on the reactivities of the monomers and modifier and the temperature of the reaction. Agitation of the emulsion may be continued over the time of addition if necessary.

In the second method all the water soluble components of the system and water are charged to the reaction and the monomer or monomers and modifier are added over a period of several hours. The time of addition depends on the reactivity of the various components and the temperature of the copolymerization.

In the third method all of the soluble components, the modifier, and the water are charged to the reaction vessel and the monomer or monomers are added over a period of several hours. Again, the addition time depends on the reactivity of the monomers.

In the final preferred "pre-emulsion feed technique," some of the surface active agent, polymerization initiator, and the water are charged to a vessel and heated; and an emulsion of all the remaining ingredients added over a period of several hours.

Conventional polymerization initiators may be employed to form the cationic polymer resin. For example, persulfates, hydrogen peroxide, perborates, peroxides, hydroperoxides, and azo compounds soluble in the monomers or in water with convenient radical forming reaction rates, including redox systems such as iron/versine solutions are used. Conventional chain length terminators such as dodecyl mercaptan are also desirable.

In the preparation of the cationic binder resins there may be utilized various surface active agents, suspension agents, or mixtures thereof. It is preferred that nonionic and/or cationic surface active agents be employed in the presence of the cationic monomers or resins. Representative surface active agents which may be employed include, for example, polypropyleneglycol esters of fatty acids having 12–24 carbon atoms, for example, propylene glycol monooleate, propyleneglycol monolaurate; esters of hexitan and fatty acids having 12–24 carbon atoms, for example, sorbitan monolaurate, sorbitan monooleate, sorbitan trioleate, and sorbitan sesquioleate; esters of glycerine and fatty acids having 12–24 carbon atoms, for example, glycerol monooleate, partial hexitan esters of fatty acids having from 12–24 carbon atoms, for example, polyoxyethylene 20 sorbitan monolaurate, polyoxyethylene 4 sorbitan monolaurate, polyoxyethylene 20 sorbitan monopalmitate, polyoxyethylene 20 sorbitan monostearate; polyoxyethylene ethers of fatty alcohols having from 12–24 carbon atoms, for example, polyoxyethylene 4 lauryl ether, polyoxyethylene 10 oleyl ether, polyoxyethylene 2 oleyl ether, polyoxyethylene 12 tridecyl ether; polyoxyethylene esters of fatty acids having 12–24 carbon atoms, for example, polyoxyethylene 8 laurate; fatty acid esters of polyoxyethylene ethers of hexitols, polyoxyethylene 4 sorbitol oleate to name a few nonionic surfactants, and cationic surfactants such as cetyl pyridinium chloride, benzethonium chloride, and other well known quaternary ammonium chlorides can be employed. Particularly useful is a combination of a nonionic with a cationic surface active agent such as "Renex" 650 polyoxyethylene 30 nonyl phenol, a product of ICI United States Inc. and a cationic surfactant "Alacsan" QNA, a product of Alcolac Chemical Corporation, in weight ratios of 0.3–3. The combined weight of the surface active agent required generally averages between 1 and 15 percent by weight of the polymerizing ingredients.

The polymer dispersions described above may be used as such in the preparation of coated fibrous materials or they may be converted to dry particulate form by removing the water by known means, for example, by evaporation carried out under reduced pressure, spray drying or fluidized bed techniques. The polymeric particles may also be separated from water by centrifugation and thereafter dried. These powders may also be used as binder resins in preparing the styrene insoluble materials which are characteristic of the preferred compositions. However, when powder forms of the resins are employed, it is essential that the size of the particles be such that particles are retained by the fibrous mat during preparation thereof.

Representative novel cationic polymer emulsions are exemplified by compositions 3, 4, 5 and 8 of Table I in proportions shown as parts by weight. Compositions 1, 2, 6 and 7 of Table I are additional examples of cationic polymers which, when crosslinked with polyester resins, form novel compositions of the invention. All the compositions of Table I are prepared preferably by the pre-emulsion technique as previously described.

TABLE I

Cationic Polymer Emulsions

| Ingredients | 1 | 2 | 3 | 4 | 5 | 6 | 7 | 8 |
|---|---|---|---|---|---|---|---|---|
| Styrene | 1220 | 2256 | 1224 | 984.0 | 1101.6 | 102 | 1224 | 102 |
| Butyl Acrylate | 1512 | 240 | 1080 | 1080.0 | 972.0 | 90 | 1512 | 90 |
| Methacrylic Acid | 225.6 | 225.6 | 225.6 | 120.0 | 108.0 | 18.8 | 225.6 | 10 |
| Methyl Methacrylate | — | 240 | 432 | 672.0 | 388.8 | 36 | — | 36 |
| Dimethylaminoethyl Methacrylate - Dimethylsulfate Quaternary Salt (40%)* | 408.8 | 408.8 | — | 408.8 | 367.9 | 34.1 | 408.8 | 34.1 |
| Dimethylaminoethyl Methacrylate | — | — | 163.2 | — | — | — | — | — |
| N-(Isobutoxymethyl)acrylamide (85%) | — | — | — | 264.0 | 237.6 | — | — | 30 |
| Diglycidyl Ether of Bisphenol A** | 302.4 | 302.4 | 302.4 | — | — | 25.2 | 306 | — |
| Cationic Surfactant*** | 117.6 | 117.6 | 117.6 | 117.6 | 105.8 | 7.3 | 117.6 | 9.8 |
| Polyoxyethylene (30) nonylphenol**** | 51.6 | 51.6 | 51.6 | 51.6 | 46.4 | 3.2 | 51.6 | 4.3 |
| Sodium Persulfate | 14.4 | 14.4 | 14.4 | 14.4 | 13.0 | 1.2 | 14.4 | 1.2 |
| Sodium Bicarbonate | 7.2 | 7.2 | 7.2 | 7.2 | 6.5 | 0.6 | 7.2 | 0.6 |
| Sodium Bisulfate | 12 | 24 | 24 | 24.0 | 21.6 | 2.0 | 24 | 2.0 |
| Iron/Versene Solution (%) | 1.2 | 1.2 | 1.2 | 1.2 | 1.1 | 0.1 | 1.2 | 0.1 |
| Dodecyl Mercaptan | 5.76 | 5.76 | 5.76 | 5.7 | 5.2 | 0.5 | 5.76 | 0.5 |
| Deionized Water | 3991.2 | 3991.2 | 3991.2 | 3991.2 | 3592.1 | 332.6 | 3991.2 | 332.6 |
| pH adjusted with HCl to | ~3.5 | ~3.5 | ~3.5 | ~3 | ~3 | ~3 | ~3 | ~3 |

*Sipomer Q-5 Monomer, a product of Alcolac Chemical Co.
**Epon 826, a product of Shell Chemical Co.
***Alascan QNA, a product of Alcolac Chemical Co.
****Renex 650, a product of ICI United States Inc.

The acrylic emulsion polymers 1–8 of Table I are surprisingly free of gum and coagulum, stable to dilution, mechanical shear, and heat up to 40°–90° C. and are especially stable to high concentrations of cationic materials such as Cirrasol 185, a trademark material sold as a cationic fiberglass lubricant. The cationic acrylic emulsion polymers are highly compatible with various binder resins such as polyesters, epoxys and acrylics and exhibit antistatic properties when applied to various matrix materials.

A cross-linked acrylic cationic emulsion polymer-polyester resin cross-linked binder resin system can be made by combining an emulsion of the cationic material as, for example, those resins of Table I with a dispersion of a polyester resin such as those shown in Polyester Resins A and B. For preferred results, the cationic resin is blended with the polyester resin in weight ratios ranging from 0.1–10, but most satisfactory results are obtained from blends containing nearly equal amounts of cationic and polyester resins.

The following examples are directed to four combinations prepared by blending various weight ratios of polyester resins A and B with cationic acrylic resin emulsions 6 and 8 of Table I.

TABLE II

Cationic Acrylic/Polyester Resins

| Resin Compositions | Wt. Ratios (solids basis) | % Wt. Change in Styrene (minutes) | | |
|---|---|---|---|---|
| | | 1 | 5 | 15 |
| 9 Resin 6/Example B | 1:1 | 0 | −27 | −50 |
| 10 Resin 6/Example B | 1:9 | −24 | −67 | — |
| 11 Resin 8/Example B | 1:1 | +4 | +3 | −3 |
| 12 Resin 8/Example B | 1:9 | 0 | −27 | −42 |
| Acrylic Resin 6 | | +4 | +3 | +9 |
| Acrylic Resin 8 | | +5 | +6 | −5 |
| Polyester Resin Control B | | −61 | 31 100 | — |

To demonstrate the effectiveness of these compositions in their stability and insolubility in styrene, the resins are cast into films having a thickness between 0.0025 and 0.005 centimeters which are cured for 30 min. at 120° C. The solubility test involves immersing the weighed film samples in a large volume of stirred styrene for 1, 5, and 15 min. periods and thereafter determining the loss in weight. In Table II is indicated four combinations of polyester resin B with the cationic resins of emulsion Resin 6 and 8 in weight ratios of 1:1 and 1:9. The changing weight is compared with that for 100 percent polyester resin B and the cationic resins 6 and 8. The results show that while pure polyester resin is dissolved completely by styrene in less than 5 min., combinations with cationic emulsions are resistant to solution for periods up to 5 min. and more. Similar compositions made from polyester resins and those shown in Table II produce compositions having relatively low solubility in styrene.

Controllable binder resin solubility is an important property in many applications. The solubility of the binder resin in the matrix resin, especially at elevated temperatures and high pressures affects the fiber bundle integrity and largely controls the extent of fiber bundle disintegration. Many applications require a relatively insoluble binder which is nevertheless sufficiently permeable to the matrix resin so as to allow good film wet-out by the matrix resin. Therefore, the degree of binder resin solubility (or insolubility) in a matrix such as styrene, can be controlled over a broad range as demonstrated in Table II through variations in the acrylic/polyester component ratio, the total cross-linking functionality available in the acrylic and modifier components, and the extent of thermal cure.

What is claimed is:
1. A cationic cross-linkable thermosettable copolymer stable in aqueous emulsions prepared from a monomer system which comprises:
  a. 30–80 percent by weight of a non-functional alpha,beta-ethylenically unsaturated main monomer selected from the group consisting of styrene, alkyl styrenes, alkyl acrylates, methacrylates, vinyl ethers, vinyl acetates and substituted vinyl derivatives;
  b. 0.1 to 15 percent by weight of an alpha,beta-ethylenically unsaturated monomer containing carboxyl groups;
  c. up to 15 percent of acrylamide and N-alkyl substituted acrylamides;
  d. 1–15 percent by weight of an N-alkoxyalkylamido group containing alpha,beta-ethylenically unsaturated monomer; and e. up to 12 percent by weight of a cross-linkable epoxy resin modifier; and f. 1–15 percent by weight of an alpha,beta-ethylenically unsaturated monomer having the following general formula:

$$CH_2 = CR-Z-Y-NR'_3X$$

wherein

R is H or —$CH_3$;

Z is —$CO_2$,—CONH—;

Y is an alkylene group;

R' is a monovalent alkyl group the three of which may be the same or different; and X is an anion;

said alkyl group in said above described compounds being hydrocarbon radicals having 1–4 carbon atoms.

2. A resin of claim 1 wherein said main monomer is selected from the group consisting of styrene, butyl acrylate and methyl methacrylate and wherein said carboxyl containing alpha,beta-ethylenically unsaturated monomer is methacrylic acid.

3. A resin of claim 1 wherein said N-alkoxyalkyl amido group containing alpha,beta-ethylenically unsaturated monomer is N-(isobutoxy-methyl)acrylamide.

4. A resin of claim 1 wherein said alpha,beta-ethylenically unsaturated monomer of (f) is dimethylaminoethyl methacrylate, dimethyl sulfate quaternary salt.

5. A composition of claim 1 wherein said main monomer is selected from the group consisting of styrene, butyl acrylate and methyl methacrylate; said carboxyl containing alpha,beta-ethylenically unsaturated monomer is methacrylic acid; said N-alkoxyalkylamido group containing alpha,beta-ethylenically unsaturated monomer is N-(isobutoxymethyl)acrylamide; and said alpha,beta-ethylenically unsaturated monomer of (f) is dimethylaminoethyl methacrylate, dimethyl sulfate quaternary salt.

6. A composition of claim 1 wherein said cross-linkable modifier is diglycidyl ether of bisphenol A.

7. An aqueous dispersion of a composition of claim 1.

* * * * *

UNITED STATES PATENT AND TRADEMARK OFFICE
CERTIFICATE OF CORRECTION

PATENT NO. : 4,012,353
DATED : March 15, 1977
INVENTOR(S) : David Gilbert Chasin & Joseph Feltzin It is certified that error appears in the above—identified patent and that said Letters Patent are hereby corrected as shown below:

```
Column 1, line 39, "3,228,740;" should read -- 3,288,740; --.
Column 4, line 11, "polymers" should read -- copolymers --.
Column 6, line 21, "20" should read -- (20) --.
Column 6, line 21, "4" should read -- (4) --.
Column 6, line 22, "20" should read -- (20) --.
Column 6, line 23, "20" should read -- (20) --.
Column 6, line 26, "4" should read -- (4) --.
Column 6, line 26, "10" should read -- (10) --.
Column 6, line 27, "2" should read -- (2) --.
Column 6, line 27, "12" should read -- (12) --.
Column 6, line 30, "8" should read -- (8) --.
Column 6, line 31, "4" should read -- (4) --.
Column 6, line 37, "30" should read -- (30) --.
Column 7, line 19 of TABLE I, "Bisulfate" should read
                              -- Bisulfite --.
Column 7, line 12 of TABLE II, column 5, "31" should be deleted
                                  and insert -- 100 --.
Column 7, line 13 of TABLE II, column 5, "100" should be deleted.
Column 8, line 25, "resin B" should read -- resin "B" --.
Column 8, line 28, "resin B" should read -- resin "B" --.
```

Signed and Sealed this

Nineteenth Day of June 1979

[SEAL]

Attest:

RUTH C. MASON
Attesting Officer

DONALD W. BANNER
Commissioner of Patents and Trademarks